(12) United States Patent
Karnutsch et al.

(10) Patent No.: US 10,012,008 B2
(45) Date of Patent: *Jul. 3, 2018

(54) INSTALLATION BODY FOR DOOR AND/OR WINDOW HANDLES AND HANDLE ARRANGEMENT WITH ONE INSTALLATION BODY

(71) Applicant: HOPPE AG, Lana (IT)

(72) Inventors: Elias Karnutsch, Nauders (AT); Oliver Schuberth, Laas (IT)

(73) Assignee: HOPPE AG, Lana (BZ) (IT)

( * ) Notice: Subject to any disclaimer, the term of this patent is extended or adjusted under 35 U.S.C. 154(b) by 587 days.

This patent is subject to a terminal disclaimer.

(21) Appl. No.: 14/660,854

(22) Filed: Mar. 17, 2015

(65) Prior Publication Data

US 2015/0275543 A1 Oct. 1, 2015

(30) Foreign Application Priority Data

Mar. 25, 2014 (DE) ........................ 10 2014 104 119

(51) Int. Cl.
*E05B 1/00* (2006.01)
*E05B 3/06* (2006.01)
(Continued)

(52) U.S. Cl.
CPC ............ *E05B 1/003* (2013.01); *E05B 1/0061* (2013.01); *E05B 3/06* (2013.01); *E05B 15/02* (2013.01);
(Continued)

(58) Field of Classification Search
CPC .......... E05B 3/06; E05B 3/065; Y10T 292/82; Y10T 292/85; Y10T 292/854
(Continued)

(56) References Cited

U.S. PATENT DOCUMENTS

| 1,575,330 | A | * | 3/1926 | Goodman | ................. | E05B 3/06 |
| | | | | | | 70/216 |
| 3,427,061 | A | * | 2/1969 | Gresham | ................. | E05B 3/003 |
| | | | | | | 292/353 |

(Continued)

FOREIGN PATENT DOCUMENTS

DE 2208617 9/1973
DE 7709636 12/1977
(Continued)

*Primary Examiner* — Carlos Lugo
(74) *Attorney, Agent, or Firm* — Reinhart Boerner Van Deuren P.C.

(57) ABSTRACT

An installation body for door and/or window handles is composed of a base body that has at least two passage holes for the insertion of fastening screws and a recess providing a receptacle for a detent ring. The base body is made up of a top side and a bottom side. The installation body is equipped with a covering element that is rotatably mounted on the top side of the base body and covers the latter in the first rotary position relative to the base body and allows access to the passage holes in the second rotary position relative to the base To meet aesthetic requirements and prevent visibility of parts of the subconstruction, the bottom side of the base plate is equipped with a lower covering. The covering element and the lower covering part fully surround the base body in the first rotary position of the covering element.

13 Claims, 7 Drawing Sheets

(51) Int. Cl.
*E05B 15/02* (2006.01)
*F16M 13/02* (2006.01)
*E05B 3/00* (2006.01)

(52) U.S. Cl.
CPC ............. *F16M 13/02* (2013.01); *E05B 3/065* (2013.01); *Y10T 292/82* (2015.04); *Y10T 292/85* (2015.04); *Y10T 292/854* (2015.04)

(58) Field of Classification Search
USPC .................................. 292/347–349, 357
See application file for complete search history.

(56) References Cited

U.S. PATENT DOCUMENTS

| | | | | |
|---|---|---|---|---|
| 4,773,240 | A * | 9/1988 | Foshee | E05B 17/0058 70/222 |
| 5,149,155 | A * | 9/1992 | Caeti | E05B 55/005 292/336.3 |
| 5,364,139 | A * | 11/1994 | Bergen | E05B 13/004 292/169 |
| 5,762,387 | A * | 6/1998 | Edgerly | E05B 3/06 292/347 |
| 5,787,743 | A * | 8/1998 | Weigard | E05B 17/0058 292/336.3 |
| 6,425,613 | B1 * | 7/2002 | Shen | E05B 15/02 292/348 |
| 6,527,314 | B2 * | 3/2003 | Brown | E05B 13/005 292/336.3 |
| 6,601,270 | B2 * | 8/2003 | Eckhardt | E05B 3/00 16/412 |
| 8,210,580 | B2 * | 7/2012 | Engel | E05B 15/0053 292/252 |
| 8,733,806 | B2 * | 5/2014 | Kuppelwieser | E05B 3/04 292/336.3 |

FOREIGN PATENT DOCUMENTS

| | | | |
|---|---|---|---|
| DE | 27 52 213 A1 | 5/1979 | |
| DE | 3935074 | 4/1991 | |
| DE | 29806679 | 8/1998 | |
| DE | 298 18 559 U1 | 3/2000 | |
| DE | 20317765 | 3/2004 | |
| EP | 460297 A1 * | 12/1990 | |
| EP | 1514984 | 9/2009 | |
| EP | 2476823 A2 * | 7/2012 | ............... E05B 3/00 |
| EP | 2543795 A2 * | 1/2013 | ............... E05B 3/06 |
| EP | 2924196 A1 * | 9/2015 | ............... E05B 3/06 |
| JP | 06026247 A * | 2/1994 | ............... E05B 1/00 |
| WO | 2000/23677 A1 | 4/2000 | |

* cited by examiner

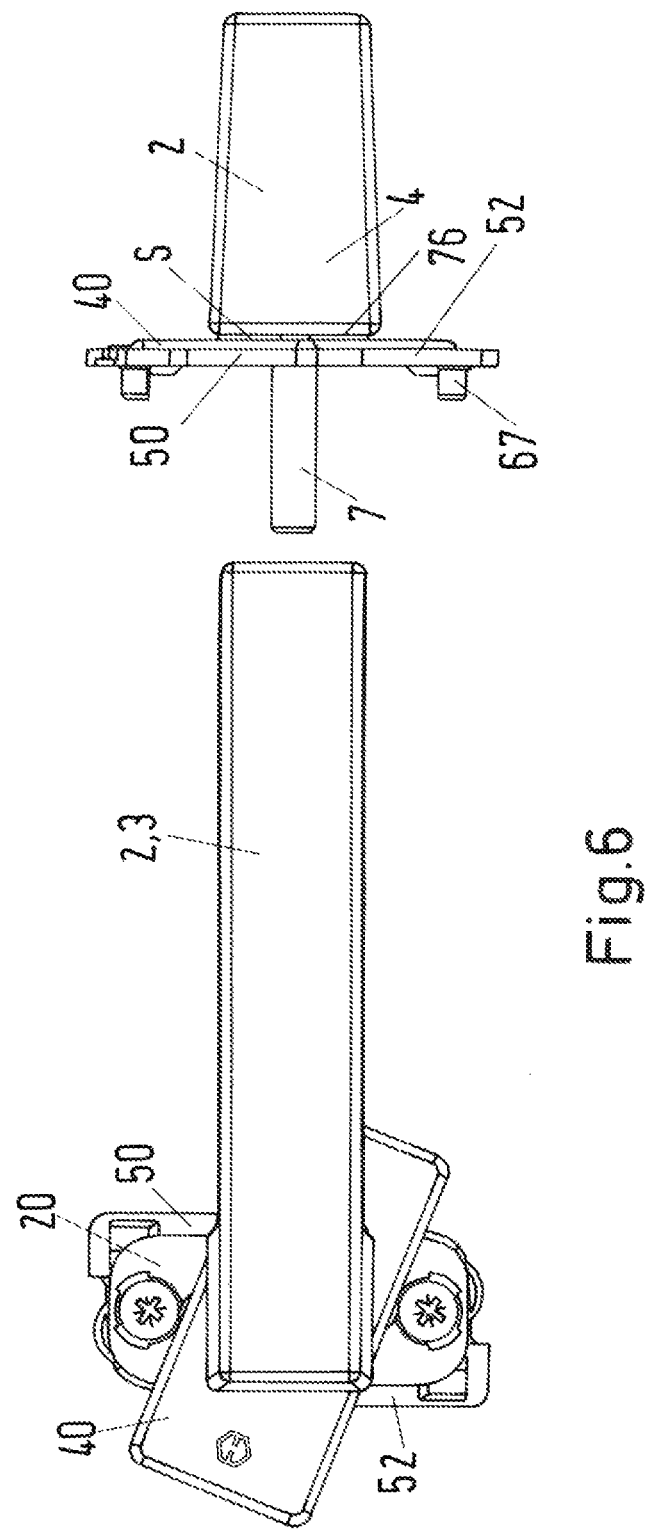

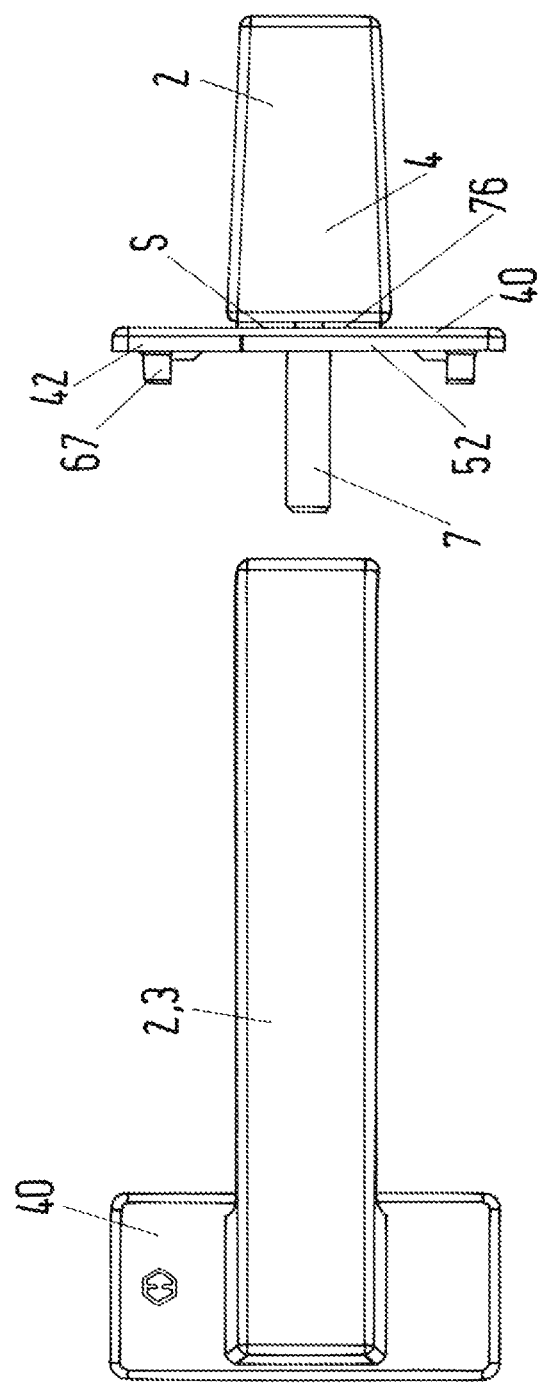

INSTALLATION BODY FOR DOOR AND/OR WINDOW HANDLES AND HANDLE ARRANGEMENT WITH ONE INSTALLATION BODY

BACKGROUND OF THE INVENTION

Field of the Invention

The invention relates to an installation body for door and/or window handles as well as a handle arrangement with an installation body.

Handles for doors and/or windows are generally mounted on an installation body in an axially fixed and rotatable manner and fastened to the door leaf of a door or the frame profile of a window with that installation body. The handle and installation body form a handle arrangement, wherein the installation body is composed of the base body, which is equipped with an opening used as a rotatable receptacle for a handle as well as at least two passage holes for screws. The screws are fastened in the door leaf or the frame profile. To prevent the screws from being visible after installing the base body on the door or the window, a covering element is used that is positioned at the central opening of the base body and is rotatable. In order to mount the handle and/or the base body on the door or window, the covering element is first swiveled away from the base body so that the passage holes for the screws are accessible. After assembly, the covering element is swiveled back into place and the screws are covered with the covering element being flush with the base body at the edges. Should the handle arrangement be dismantled, the covering element is swiveled away so that the screws are accessible again.

A fitting for doors and windows known from German Patent Application Publication No. DE 22 08 617 A1 positions the covering element on the base body as a rotatable covering plate, which has an opening for the handle as well as holes for two fastening screws. A disk made of low-friction material is positioned between the covering plate and the handle. In order to fixate the cover plate in an effective position where it covers the base component, the cover plate is provided with a circumferential rip at its outer edge, which engages with a corresponding recess positioned at the edges of the base component. A recess for the insertion of a spring washer and a fastening ring is provided on the rear of the base component with the spring washer making sure that the cover plate cannot inadvertently twist out of its effective position and that the cover plate can be lifted slightly in order to swivel it away from the base component. This arrangement can be problematic as both the washer as well as handle have to be lifted together with the cover plate, which is not only cumbersome, but can also lead to damage to the cover plate itself.

German Patent Application Publication No. DE 39 35 074 A1 describes an actuating unit for a window or door latch with a rosette base body and a cover plate being positioned on the base body, while a spring element is positioned between the rotatably mounted handle and the cover plate in order to allow for the cover plate to be fastened to the base body. To prevent this element from getting lost and in order to simplify assembly, the spring element is connected on one side with the cover plate or the rosette base body. Due to the spring element, it is possible to lift the cover plate off the base body during assembly of the actuation unit on a window or door and to swivel it away. This means that the cover plate also has to be lifted up prior to swiveling it to the side in this case, which is only possible if there is sufficient space between the handle and the cover plate and is still a cumbersome process.

European Patent No. EP 1 514 984 B1 describes a handle arrangement with an oblong rosette. This arrangement is equipped with an installation body with fixing cams and a bearing bush for the handle, as well as a cover plate or cap spanning the installation body as well as the bearing bush. The latter is designed to be flexible and is held on the installation body by axial locking on the bearing bush. The cover plate or cap can also be attached and detached from the ends of the installation body by a swiveling motion, while the ends of the cover plate or cap can glide on the ramps of the installation body during this swiveling motion. This means that the cover plate or cap no longer has to be lifted from the installation body. However, it has to be made out of a sufficiently flexible material, which may cause other problems over time.

The known installation bodies also suffer from the disadvantage that they always require a spring or latching elements for the positioning and fixation of the cover plate or cap, which not only results in an elaborate construction, but also requires a relatively large amount of free space or distance between the handle and covering element in order to be able to fix the covering element in place or to lift it in order to swivel it away from the base body. In addition, the base body is always positioned on the door leaf or the frame profile of the window. It is therefore visible, which often does not satisfy modern aesthetic requirements, especially if the base body and covering element are made of different materials.

Covering elements, which also obscure the base body or rosette body of the handle arrangement in the lateral sections, are often designed as cover caps (see, for example, German Utility Model No. DE 298 06 679 U1 in this regard). Such a cover cap cannot, however, be swiveled away. It has to be fully lifted from the base body or the rosette body—in order to access the screws—and be slid across the handle or rather the handle neck. For this purpose, the cover cap is provided with a central opening the diameter of which is larger than the outer diameter of the handle neck. This operation is considered quite problematic since even a lifted cover cap is often in the way when screwing or unscrewing the base body. In addition, the handles quickly accumulate scratch marks whenever the cover cap is lifted. The opening of the cover cap also prevents components of the subsconstruction from being fully obscured, which again does not satisfy aesthetic requirements as mentioned before.

It would be desirable to avoid these and other disadvantages presented by the current state of the art and to develop a door and/or window handle that is inexpensively constructed with simple means and ensures a visually unified and closed appearance while also significantly reducing the construction height of the installation body. The installation body may be easier to handle and also capable of withstanding higher stresses in a permanent manner.

SUMMARY OF THE INVENTION

An installation body for door and/or window handles has a base body that is equipped with one centrally arranged recess and at least two passage holes for fastening screws, wherein the base body is composed of a top side and a bottom side as well as a covering element that is rotatably arranged on the top side of the base body and covers the base body in its first rotary position relative to the base body, and in its second rotary position relative to the base body allows access to the passage holes, with an arrangement of a lower covering part on the bottom side, wherein the covering element and the lower covering part surround the base body in the first rotary position of the covering element.

This results in an appearance that is always visually unified and closed, while only requiring a low construction height as the covering element and the lower covering part surround the base body through the use of which the handle is fastened to a door or window in a manner similar to a housing, so that the base body cannot be seen from the outside. For the purposes of assembly or disassembly of the base body, the covering element can, however, be turned to the second rotary position relative to the base body at any time so that the passage holes in the base body and—if present—the fastening screws are accessible. In this regard, the covering element does not have to be lifted either relative to the base body or relative to the handle, since the covering element always moves on a single level—the level of the lower covering part, which is arranged beneath the base body and is immobile. Therefore, the distance between the handle and the covering element can be reduced to a minimum, since no spring or latching elements are required to hold the covering element on the base body. The installation body in accordance with the invention is designed in a simple and cost-efficient manner, and is very easy to handle in general.

The invention also discloses that the covering element may be provided with an edge that laterally covers the base body and that is interrupted in opposing areas. The lower covering part is also equipped with an edge that laterally covers the base body and that is interrupted in opposing areas. In this regard, both edges are designed in such a manner that the edge of the covering element and the edge of the lower covering part form a visually closed edge in the first rotary position of the covering element relative to the base body. The base body is therefore not only covered on the top and bottom sides by the covering element and the lower covering part after the covering element has reached its first rotary position, but also on the sides due to the edges, meaning that the base body is not visible from the outside at all. A corresponding design of the covering element and lower covering part, the materials of which can be selected independently of those used of the base body, allows the highest aesthetic demands to be satisfied.

The edges of the covering element and the lower covering part are complementary in design, meaning that the edges of the covering element are situated between the edges of the lower covering part and the edges of the lower covering part are situated between the edges of the covering element, the covering element is in its closed position. Both edges thereby complement each another to form a visually closed edge as soon as the covering element on the bottom side has assumed its first closed rotary position, whereby the covering element and the lower covering part are always at the same height. The height of the edge is dependent on the height of the base body and is particularly adapted to its height so that the base body is always fully surrounded—also laterally—by the still movable covering element and the lower covering part.

In order to rotatably mount the covering element, it is provided with an opening that is positioned concentrically with respect to the recess of the base body. The lower covering part, in turn, has a base (floor) with a hole that is concentrically aligned with respect to the recess of the base body. In addition, other passage holes are provided in the base (floor) of the lower covering part in the area of the passage holes of the base body. These are also used for the fastening screws, which are screwed in place to fasten the base body to the door leaf or the frame profile of the window.

To ensure that the covering element always remains securely in the first rotary position and does not inadvertently twist during the actuation of the handle, the covering element and the lower covering element are connected with each other in the first rotary position of the covering element in a force-locking, friction-locking, and/or positive-locking manner. This connection can also be established using latching elements that are provided on both the covering element as well as the lower covering part. Alternatively, it is possible to use suitable clamping or friction elements that fasten the covering element to the lower covering part in such a manner that the connection can be released again.

An alternative embodiment of the invention provides a covering element that is rotatably mounted on the base body using a flange ring. This ring would preferably be provided with a ring section that extends into the opening in the covering element that is positioned concentrically to the recess of the base body and that is connected to or engaged with the base body in a manner protected against rotation using fitted keys. In this manner, the flange ring cannot twist, and the covering element can be laterally moved without problems.

The flange ring is also provided with a flange edge that is positioned on the top side of the covering element in the area of the opening of that component. This allows the covering element to be axially secured on the base body. At the same time, the flange edge provides a thrust bearing for the handle. It is important in this regard that the flange edge of the flange ring is provided with a flat front surface, since the front surface forms a bearing area for the handle. If such a handle, where a driving pin is generally inserted into the front of the installation body and which forms an operative connection with the door leaf or frame profile via an actuation element, is axially mounted on the installation body, then the handle neck of the handle can sit flush with the flange edge of the flange ring on its front surface so that the handle is stably and precisely mounted on the installation body in a permanent manner. The axial fixation of the handle may be, for example, achieved using one or two locking washers that are placed on the driving pin in a force-locking or friction-locking manner and that push against the bottom side of the base body of the installation body from below.

The anti-twist protection of the flange ring against the base body may be provided by complementary engagement elements or fitted keys that are correspondingly provided on the flange ring and the base body.

In accordance with another embodiment of the invention, a detent ring may be inserted into the base body, wherein it is held inside the base body in a non-twisting manner, for example using fitted keys. Such a detent ring can, for example, be used to fixate the handle in certain rotary positions relative to the installation body or base body in such a way that a certain torque has to be overcome in order to rotate the handle any further. For this purpose, a spring-loaded opposite detent ring may be provided in the handle as an axially movable component that is engaged with the detent ring in the designated rotary positions of the handle in a force-locking and positive-locking manner. In the axial direction, both the detent ring and opposite detent ring are provided with corresponding latching elements and opposite latching elements, for example in the form of recesses and elevations.

The flange ring is fixed on the latching ring, preferably on the edges. It is also supported by the base body in the axial direction, thereby resulting in a stable and non-twisting pivot bearing for the handle. The front surface of the flange edge on the flange ring can be designed to be flush with an edge section of the detent ring so that a handle that is axially fixed inside the installation body using the lock washers is always optimally supported on the flange ring and detent ring. At the same time, the detent ring, the flange ring, and the covering element are axially secured on the base body to both create a compact construction unit and to provide a permanently reliable bearing for the handle on the installation body.

The base body and the lower covering part can also be interlocked to prevent the lower covering part from getting lost if the installation body and/or the handle arrangement are currently not fitted to a door or window. Both can therefore be firmly connected to each other prior to the assembly of the installation body, and then be jointly mounted on the door or window. A latching connection is, for example, provided to fixate the lower covering part on the base body. This connection is composed of a first latching element, for example, in the form of a mandrel that is present on the lower covering part, as well as a second latching element, for example, in the form of an opening or recess in the base body. If the mandrel is then inserted into its assigned opening, the lower covering part is fixated on the base body. The latter is preferably positioned flat on the base (floor) of the lower covering part.

Another important embodiment of the invention provides that the base body is a substantially flat plate. This allows for the overall construction height of the installation body to be reduced to a minimum and results in only the flat arrangement composed of the covering element and lower covering part being visible when positioned on the door leaf or profile frame of the window, since they form a closed cover for the installation body when the covering element is in its first rotary position.

The usage of flat-head screws also contributes to the flat appearance of the installation body. To ensure that these flat-head screws can form a flush connection with the base body, a countersunk recess that serves as a receptacle for the screw head is provided in each passage hole of the base body.

To provide an anti-twist protection for the installation body on the door leaf or frame profile of the window, it is additionally intended that tappet-like protrusions are provided on the rear side of the lower covering part that is opposite from the base body. When the installation body is placed on the door or window, these tappet-like protrusions enter the holes for the fastening screws contained therein.

From a constructive perspective, it is advantageous for the covering element and lower covering part to be symmetrically arranged relative to the center point of the main recess inside the base body. This not only simplifies the design of tools required for the components, which would preferably be made of plastic but it also reduces manufacturing costs.

It would further be advantageous for the installation body to be designed as a component of a handle arrangement wherein the handle is mounted on the installation body in an axially-fixed and rotatable manner. Such a handle arrangement is fitted to a door or window using the installation body, though the covering element can be swiveled away to the side in order to allow access to the fastening screws and/or the passage holes intended for this purpose. The ability to swivel the covering element to the side relative to the base body and the lower covering part means that no gap between the handle and cover cap is required for a spring or latching elements. The covering element also does not have to be spring-loaded in order to make it sit flush on the base body. The resulting design of the covering element and the lower covering part achieves a closed housing that fully surrounds the base body on all sides—if the handle arrangement is installed and in the first rotary position of the covering element. This means that it is possible to choose a stable and robust material for the base body—independent of the material chosen for the covering element and the lower covering part—since the appearance of the base body is no longer of importance due to it not being visible from the outside. Still, the covering cap can be swiveled to the side at any time in order to access the fastening screws. If the installation body is mounted and if the covering element is in its first closed rotary position, the base body is optimally obscured, resulting in an outer appearance of the handle or handle arrangement that is always aesthetically pleasing. Visually, only a closed covering element rests on the door leaf or frame profile, the construction height of which is also reduced to a minimum.

DESCRIPTION OF THE DRAWINGS

Other features, characteristics, and advantages of the invention result from the wording of the claims as well as the following description of embodiment examples (examples of further development) based on the enclosed drawings in which:

FIG. 6 shows a top view and a side view of the handle arrangement of FIG. 1 with the cover plate swiveled away; and FIG. 7 shows a top view and a side view of the handle arrangement of FIG. 1 with the cover plate swiveled into place.

DETAILED DESCRIPTION OF THE EXEMPLARY EMBODIMENTS

Figure 1:
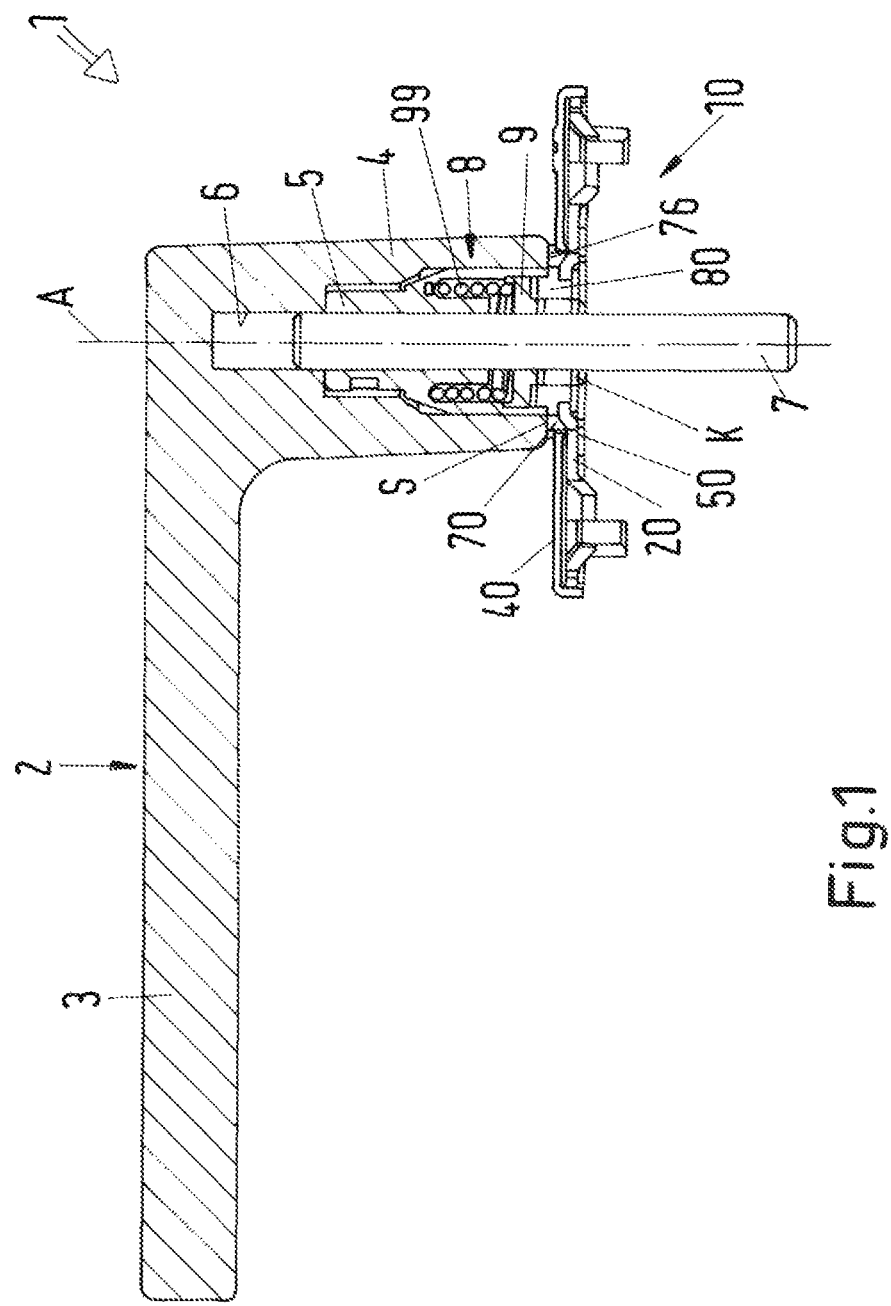
FIG. 1 shows a cross-sectional view of the handle arrangement with an installation body and the handle rotatably mounted therein.

The handle arrangement generally designated as 1 in FIG. 1 is intended for the actuation of a door or window. It is composed of a handle 2 as well as an installation body 10, wherein the handle 2 is mounted on the installation body 10 in a rotatable and axially-fixed manner. The installation body 10 is fastened to the door or window using fastening screws (not shown).

The handle 2 has a main handle section 3 and a handle neck 4 wherein a socket-shaped insert 5 is inserted in an axially-locked and non-rotatable fashion. As shown in FIG. 1, the socket-shaped insert 5 forms a flush connection with the front surface (S) of the handle neck 4. A square hole 6 is provided in the socket-shaped insert 5 and the handle neck 4 that is concentrically aligned with a rotary axis (A) of the handle 2 and which a driver and/or driving pin 7 is engaged with in order to actuate a locking drive (not shown) in the door or window. The socket-shaped insert 5 is additionally equipped with an axially acting detent 8 with an opposite detent ring 9 and a pressure spring 99, which lock the handle 2 in the designated rotary positions relative to the installation body 10 in combination with the detent ring 80 on the installation body 10.

Figure 2:
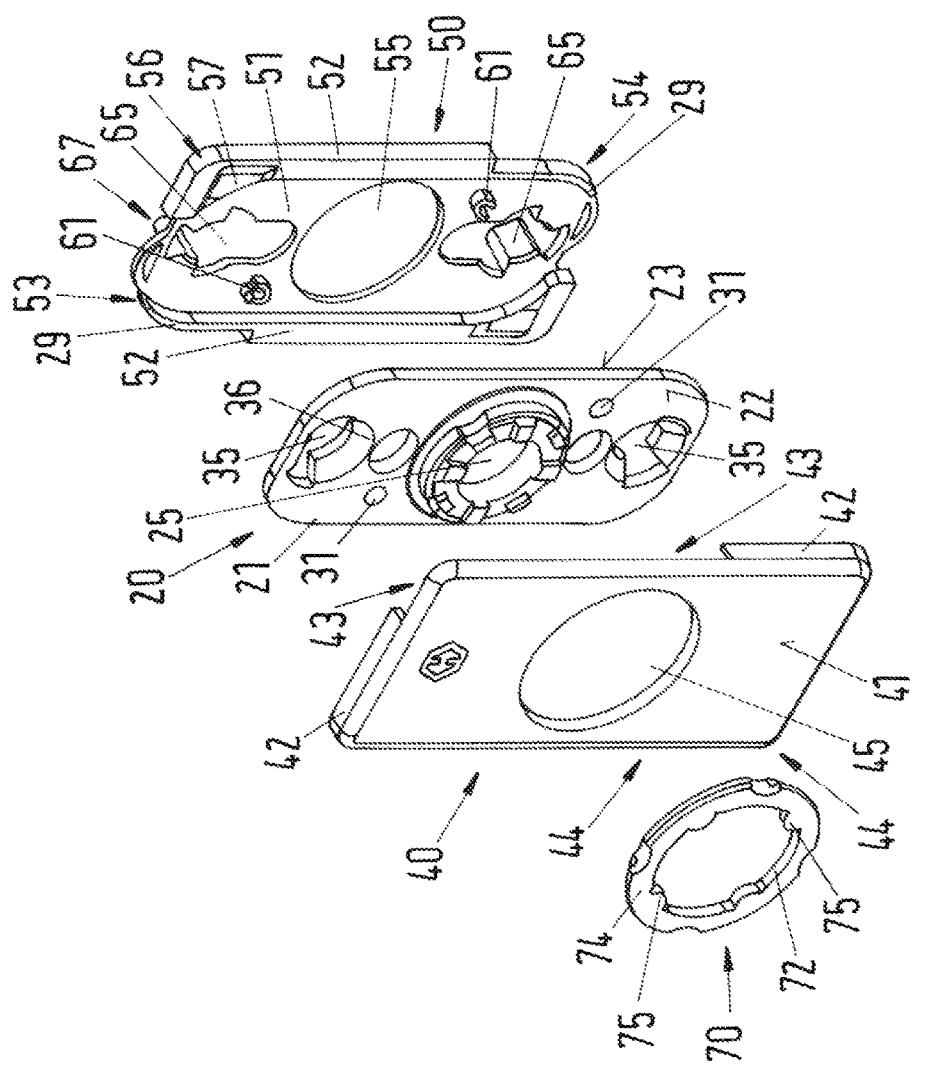
FIG. 2 shows an exploded view of the installation body of FIG. 1.
Figure 3:
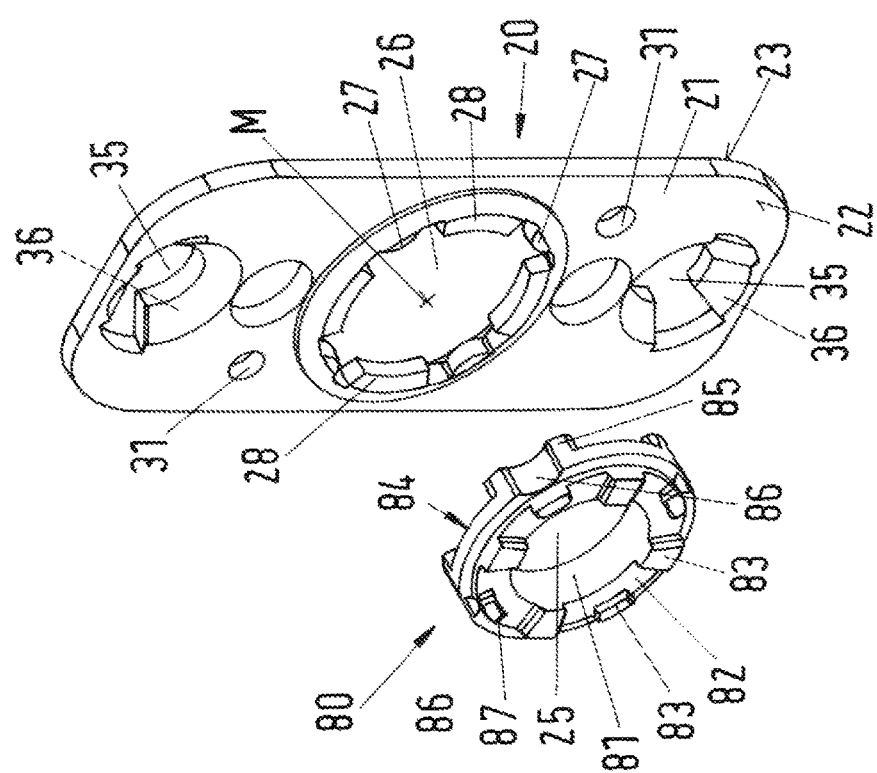
FIG. 3 shows an installation body with a lifted detent ring.
Figure 4:
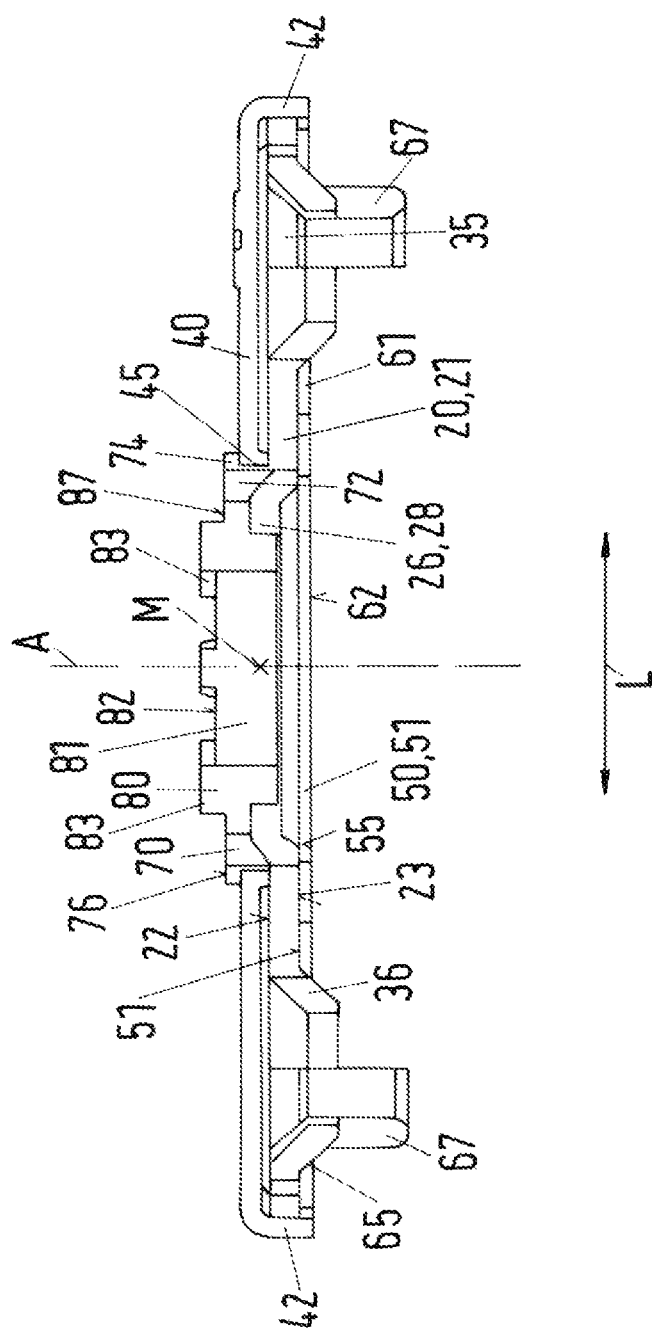
FIG. 4 shows a cross-sectional view of the installation body of FIG. 1.

The installation body 10 has a base body 20 with a recess 26 that is centrally aligned with the rotary axis (A) of the handle 2—as shown in detail in FIGS. 2 to 4. This recess 26 is used as a non-rotatable receptacle of the detent ring 80 and as feedthrough for the driving pin 7 so that this component can engage with the locking drive of the door or window through the detent ring 80. As a receptacle for the fastening screws (not shown), which should preferably be flathead screws, the base body 20 is equipped with two passage holes 35, which—relative to a longitudinal axis (L) of the base body and the rotary axis (A) of the handle 2—are symmetrically aligned with the recess 26 inside the base body 20. The base body 20 is preferably designed as a flat plate 21 that consists of a top side 22 and a bottom side 23.

In the example shown in FIGS. 2 to 4, the detent ring 80 has a central opening 25 for the driving pin 7 wherein the opening 25 is limited by the cylindrical inner wall 81. The detent ring 80 is provided with multiple (preferably four or eight) detent edges 83 that are distributed along the entire circumference of the detent ring 80 at equidistant angular distances on the front surface 82 facing the handle 2 and the opposite detent ring 9 of the detent 8. The detent ring 80 is provided with four axial protrusions 85 on the opposing front side 84 facing away from the handle 2, which are, in turn, each provided with an indentation 86 at its outer circumference. Using these axial protrusions 85, the detent ring 80 engages with the central opening 26 inside the plate 21 of the base body 20, which is provided with radially protruding lugs 27 that are opposite of the indentations 86 and are positioned along the inner circumference in the same areas as the axial protrusions 85. In this manner, the detent ring 80 is always positioned inside the plate 21 in a non-rotatable manner, meaning that the lugs 27 and the indentations 86 function as an anti-rotation mechanism between the detent ring 80 and the base body 20. The axial protrusions 85 and the radial lugs 27 therefore function as fitted keys that engage with each other in a positive-locking manner when the detent ring 80 is inserted into the base body 20, and thereby lock the detent ring 80 into place in the circumferential direction.

The inner circumference of the recess 26 is furthermore provided with radial protrusions 28, which are radially positioned between the axial protrusions 85 of the detent ring 80 after insertion of the detent ring 80 into the plate 21. In this manner, the detent ring 80 rests on the radial protrusions 28, which means that it is supported by the base body 20. It therefore cannot slide through the plate 21, and it is always held in a non-twisting manner.

A covering element 40 is located above the base body 20, and is rotatably arranged on the top side 22 of the plate 21 and covers the base body 20 in a first rotary position relative to the base body 20 (also see FIG. 7 in this regard). In a second rotary position relative to the base body 20, the covering element 40 allows access to the passage holes 35 so that the installation body 10 can be installed using the fastening screws—or the screws can be loosened for removal purposes without any problems (also see FIGS. 5 and 6 in this regard).

The covering element 40 lays flat on the plate 21 and is equipped with a central opening 45 that is, in turn, concentrically aligned with the recess 26 of the base body 20. It is rotatably mounted on the base body 20 using a flange ring 70. The flange ring 70 is preferably provided with a ring section 72 that rests on the base body 20 in the axial direction and extends through the opening 45 in the covering element 40—as shown in FIG. 4. The flange ring 70 then surrounds the detent ring 80 and is connected with the detent ring 80 in a non-rotatable manner using fitted keys 75. To this end, radially protruding lugs 75 that are located opposite to the indentations 86 inside the axial protrusions 85 of the detent ring 80 are positioned on the inner circumference of the flange ring 70—as best shown in FIG. 2. This means that the lugs 75 of the flange ring 70 and the indentations 86 of the detent ring 80 engage to form fitted keys that serve as an anti-rotation mechanism. The covering element 40 can therefore be laterally swiveled relative to the base body 20 without any problems.

In order to axially lock the covering element 40, the flange ring 70 has a flange edge 74 that is in contact with the top side 41 of the covering element 40 in the area of the opening 45 of the latter. The flange edge 74 of the flange ring 70 is preferably equipped with a flat front surface 76, whereby the handle neck 4 rests on the front surface 76 of the flange ring 70 with its own front surface (S) in a gliding fashion if the handle 2 is installed. The axial fixation of the handle 2 on the installation body 10 is preferably achieved using a clamping element (K) that is firmly positioned on the driving pin 7 and is preferably pressed onto the driving pin 7. The clamping element (K) is engaged with the side walls of the driving pin 7 in a force-locking and/or friction-locking manner, and is supported on the bottom side 23 of the base body 20. In this manner, the handle 2 is pulled against the front surface 76 of the flange ring 70 with its front surface (S), wherein the handle neck 4 sits flush and is stable on the flange edge 74. This results in the handle 2 being stably and precisely mounted on the installation body 10. The front surface (S) of the handle neck 4 and the front surface 76 of the flange ring 70 combine to form a plain bearing for the handle 2, which can easily and precisely be rotated around its rotary axis (A). It is apparent that only the flange edge 74 of the flange ring 70 is situated between the handle neck 4 and the covering element 40 so that the gap between the handle 2 and the covering element 40 is reduced to a minimum and is therefore barely visible from the outside. In order to improve the strength of the handle arrangement 1, particularly the connection between the handle 2 and the installation body 10, it is possible to use two clamping elements (K)—as shown in FIG. 1.

To stabilize the rotary bearing of the handle 2, the detent ring 80 can also be provided with a circumferential edge 87 that—as shown in FIG. 4—is detached from the front surface 82 in a cascading manner and closes flush with the front surface 76 of the flange ring 70. This results in an enlarged support and bearing area for the handle neck 4 and the socket-shaped insert 5, wherein the front surface (S) of the handle neck 4 rests on the front surface 76 of the flange ring 70 and the circumferential edge 87 of the detent ring 80.

The bottom side 23 of the plate 21 on the base body 20 is provided with a lower covering part 50, wherein the covering element 40 and the lower covering part 50 jointly surround the base body 20 in the first rotary position of the covering element 40.

The lower covering part 50, in turn, has a base 51 with an opening 55 that is concentrically aligned with the recess 26 of the base body 20. The diameter of the opening 55 is preferably designed to be larger than the outer diameter of the clamping elements (K) so that these can rest on the bottom side 23 of the base body 20 without problems. In the area of the passage holes 35 of the base body 20, passage holes 65 are provided in the base 51 of the lower covering part 50 so that the base body 20 can be fastened on the door and/or window using fastening screws. The base body 20 rests flat on the base 51 of the lower covering part 50, which results in an arrangement that is very stable overall.

The base body 20 is also closed on the sides, meaning visually obscured, with the covering element 40 and the lower covering part 50 forming a joint circumferential edge 42, 52, which laterally surrounds the plate 21 of the base body 20. The covering element 40 is provided with an edge 42 that laterally covers the base body 20, which edge 42 is separated into opposing areas 43, 44. In these areas 43, 44, the lower covering part 50 has an edge 52 that laterally covers the base body 20, which edge 52 is also separated into opposing areas 53, 54. These opposing areas 53, 54 are located in the same location as the edges 42 of the covering element 40. This means that the edges 42 of the covering element 40 and the edges 52 of the lower covering part 50 combine to form a visually closed edge that covers the base body in a laterally circumferential manner when the covering element 40 is in its first rotary position relative to the base body 20.

However, due to the separation of the edges 42, 52 it is possible at any time to laterally rotate the covering element 40 relative to the base body 20 and relative to the lower covering part 50 at the same level in order to allow access to the fastening screws and passage holes 35. It is not required to lift the covering element 40 in this case. Additional or dedicated spring elements that push the covering element 40 against the base body 20 are no longer required since the covering element 40 is always held securely and kept rotatable by the flange ring 70.

Figure 5:
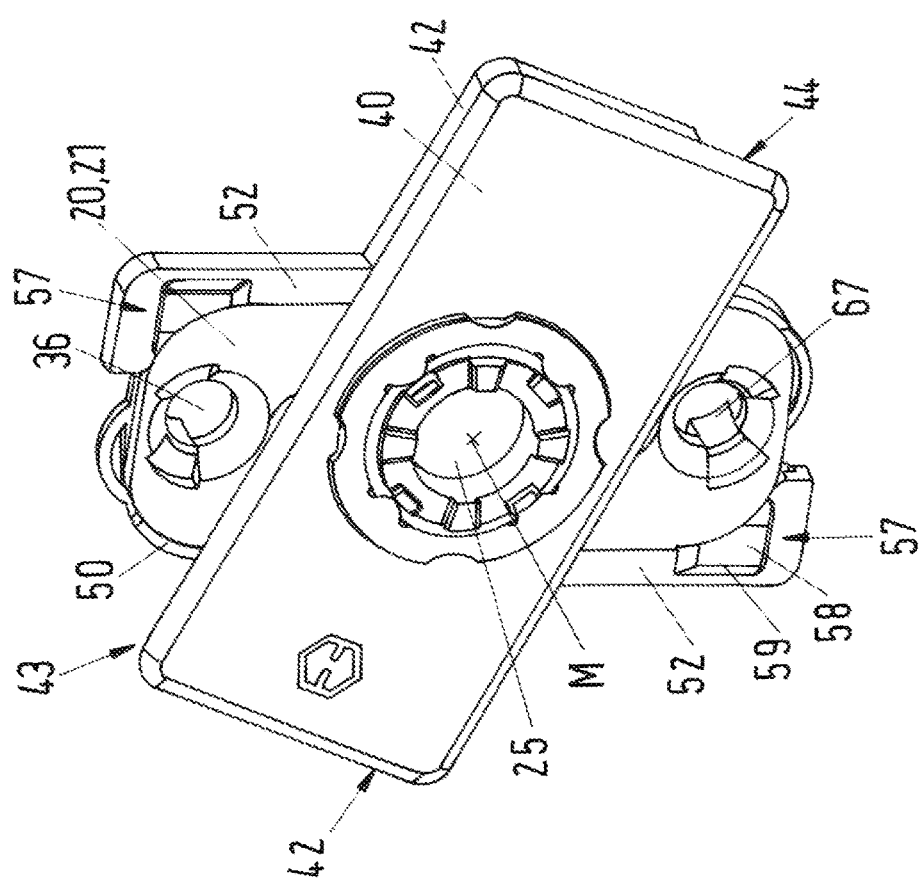
FIG. 5 shows the installation body of FIG. 1 with the cover plate swiveled away.

It is apparent that the covering element 40 and the lower covering part 50 combine to form a kind of housing around the base body 20, which is closed when the covering element 40 is in its first rotary position and covers the base body 20 from all sides, but which can at the same time be opened at one level using a simple rotary motion in order to install or remove the base body. The covering element 40 acts similarly to a swing top lid for the housing while the lower covering part 50, which is located between the base body 20 and the door or window when the installation body 10 is in an installed position, constitutes the base of the housing. The edges 42, 52 complement each other in the closed position to form side walls, which cover the base body 20 on the sides. In the open position, the trailing edges 42 of the covering element 40 form stops for the rotary motion so that the covering element 40 can only be opened and/or twisted to a certain angle—as shown in FIG. 5. The lengths of the respective edges 42, 52 on the covering element 40 and the lower covering part 50 are aligned with each other in such a manner that a rotation of the covering element 40 results in an opening angle that is sufficiently large to allow access to the fastening screws or passage holes 35 and that the edges 42, 52 exhibit a visually closed appearance when the covering element 40 is in its first rotary position.

To prevent the covering element 40 from inadvertently opening and/or twisting during use of the handle 2 due to the rotary motion of the handle 2, the covering element 40 and the lower covering part 50 are connected with each other in a force-locking, friction-locking, and/or positive-locking manner when the covering element 40 is in its first rotary position. For this purpose, the corner areas 56 of the edges 52 of the lower covering part 50 are provided with one chicane 57 each, which keep the covering element 40 in its first rotary position when it has been moved to that first rotary position. An elevation 58 is provided in each corner section 56, which exhibits lightly elevating flanks 59 that act as running surfaces. A rotation of the covering element 40 from the second rotary position to the first rotary position causes the covering element 40 to be slightly raised at the edges, while the elevation 58 is either in friction-locking contact with the covering element 40, or alternatively is provided with a corresponding (not shown) recess on its bottom side, which engages with the elevation 58. The covering element 40 itself acts as a spring element here.

To prevent the lower covering part 50 from getting lost as long as the handle arrangement 2 is not fitted to the door or window, the base body 20 and the lower covering part 50 can be interlocked with each other. For this purpose, two mandrels 61 are provided on the lower covering part 50 that clamp into or interlock with the two holes 31 inside the plate 21.

Furthermore, the lower covering part 50 can be provided with circumferential edge sections 29 that surround the base body 20 on the sides and fit the shape of the latter. The width of the edge sections 29 of the lower covering part 50 is smaller than the width of the edges 52 of the lower covering part 50 so that the covering element 40 with its edges 42 can still fully enter the first rotary position. In this first rotary position, the edge sections 29 of the lower covering part 50 are located behind the edges 42 of the covering element 40.

To ensure that the fastening screws are flush with the top side 22 of the plate 21 of the base body, every passage opening 35 of the base body 20 comprises a countersunk recess 36 to serve as a receptacle for a screw head. In order to provide an anti-twist mechanism for the installation body 10 on a door leaf or a frame profile, tappet-like protrusions are provided on the rear side 62 of the lower covering part 50 facing away from the base body 20. It is apparent that the recesses 36 in the plate 21 and the tappet-like protrusions 67 in the lower covering part 50 complement each other.

Preferably, the covering element 40 and the lower covering part 50 are designed to be symmetrically aligned within the base body 20 relative to a center point (M) of the recess 26. This simplifies the manufacturing of these elements 40, 50 as well as their handling and assembly.

The invention is not limited to the embodiments and developments detailed above, but can be modified in many ways. It is, for example, possible with a handle arrangement 1 that does not have a latching mechanism for the handle 2 using different functional positions or whose latching mechanism 8 is positioned at a different position in the handle 2 or the installation body 10 to engage the flange ring 70 directly with the plate 21 in order to act as an anti-twist protection for the flange ring 70. While the recesses 36 of the plate 21 protrude through the base 51 of the lower covering part 50, these can also be designed to be more flat so that they do not protrude through the base 51 of the lower covering part. In this case, it is possible to do without the tappet-like protrusions 67. The covering element 40 and the lower covering part 50 should preferably be made from the same material. It is also possible to use clamping and fixation elements other than the clamping elements (K) for the axial locking of the handle 2 on the installation body 10, such as serrated self-lock rings or snap rings, which could be engaged with the driving pin 7 or the handle in a suitable manner.

It is apparent that the installation body 10 for door and/or window handles is composed of a base body 20 that has at least two passage holes 35 to be used for the insertion of fastening screws, with a recess 26 serving as a receptacle for a detent ring 80, wherein the base body 20 is made up of a top side 22 and a bottom side 23. The installation body 10 is furthermore equipped with a covering element 40 that is rotatably mounted on the top side 22 of the base body 20 and covers the base body 20 when the covering element 40 is in a first rotary position relative to the base body 20, and allows access to the passage holes 35 in when the covering element 40 is in a second rotary position relative to the base body 20. In order to satisfy high aesthetic requirements and to particularly prevent that parts of the subconstruction are not visible from the outside, especially the base body 20 itself, it is intended that the bottom side 23 of the base plate 20 is equipped with a lower covering part 50, with the covering element 40 and the lower covering part 50 fully surrounding the base body 20 when the covering element 40 is in the first rotary position. The covering element 40 and the lower covering part 50 are both equipped with circumferential edges 42, 52 in certain sections with the edges 42, 52 complementing each other to form a visually closed seal that covers the entire base body 20 on the sides when the covering element 40 is in its first rotary position relative to the base body 20. The covering element 40 is rotatably mounted on a flange ring 70 with the flange edge 74 of that flange ring 70 being in contact with the top side 41 of the covering element 40. The fitted keys 27, 75, 85 are intended to serve as an anti-twist protection for the flange ring 70, while the flange ring 70 surrounds the detent ring 80 that, in turn, is supported by the fitted keys 27, 85 on the base body 20 in a non-twisting manner.

All characteristics, features and advantages arising from the claims, the description and the drawings, including any constructive details, spatial arrangements and process steps can be crucial to the invention by themselves as well as in various different combinations.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

LIST OF REFERENCE SIGNS

| | |
|---|---|
| A | Rotary axis |
| K | Clamping element |
| L | Longitudinal axis |
| M | Central point |
| S | Front surface |
| 1 | Handle arrangement |
| 2 | Handle |
| 3 | Main handle part |
| 4 | Handle neck |
| 5 | Socket-shaped insert |
| 6 | Square hole |
| 7 | Driving pin |
| 8 | Detent |
| 9 | Opposite detent ring |
| 10 | Installation body |
| 20 | Base body |
| 21 | Plate |
| 22 | Top side |
| 23 | Bottom side |
| 25 | Central opening |
| 26 | Recess |
| 27 | Lug |
| 28 | Radial protrusion |
| 29 | Edge trim |
| 31 | Hole |
| 35 | Passage opening |
| 36 | Receptacle |
| 40 | Covering element |
| 41 | Top side |
| 42 | Edge |
| 43 | Area |
| 44 | Area |
| 45 | Opening |
| 50 | Lower covering part |
| 51 | Floor |
| 52 | Edge |
| 53 | Area |
| 54 | Area |
| 55 | Opening |
| 56 | Corner area |
| 57 | Chicane |
| 58 | Elevation |
| 59 | Flank |
| 61 | Mandrel |
| 62 | Back side |
| 65 | Passage openings |
| 67 | Tappet-like protrusion |
| 70 | Flange ring |
| 72 | Ring section |
| 74 | Flange edge |
| 75 | Lug |
| 76 | Front surface |
| 80 | Detent ring |
| 81 | Inner wall |
| 82 | Front side |
| 83 | Detent edge |
| 84 | Opposing front side |
| 85 | Axial protrusion |
| 86 | Indentation |
| 87 | Circular edge |

What is claimed is:

1. An installation body assembly for door and/or window handles comprising:

a base body having one centrally arranged recess and at least two passage holes for accommodating fastening screws therein, the base body a top side and an opposite bottom side;

a covering element that is rotatably arranged on the top side of the base body, the covering element having a first rotary position with respect to the base body in which the covering element covers the base body and a second rotary position with respect to the base body in which the covering element allows access to the passage holes in the base body; and a lower covering part located on the bottom side of the base body;

wherein the covering element and the lower covering part surround the base body when the covering element is in the first rotary position;

wherein the covering element is rotatably secured on the base body with a flange ring having a flange edge that is in contact with a top side of the covering element in the area of the opening in the covering element;

wherein the flange edge of the flange ring has a flat front surface;

wherein the front surface of the flange ring forms a bearing surface for a handle to be mounted on the installation body; and wherein a detent ring is inserted into the base body while the flange ring is fixed on the detent ring.

2. The installation body assembly as defined in claim 1, wherein the covering element is provided with edges that laterally cover the base body, which edges comprise two opposing areas.

3. The installation body assembly as defined in claim 2, wherein the covering element has an opening that is concentrically aligned with the recess in the base body.

4. The installation body assembly as defined in claim 2, wherein the lower covering part is provided with edges that laterally cover the base body, which edges comprise two opposing areas.

5. The installation body assembly as defined in claim 4, wherein the edges of the covering element and the lower covering part are arranged and configured such that the edges of the covering element and the edges of the lower covering part collectively form a visually closed edge when the covering element is in the first rotary position with respect to the base body.

6. The installation body assembly as defined in claim 1, wherein the lower covering part comprises a base having an opening that is concentrically aligned with the recess in the base body, additionally comprising passage holes in the lower covering part that are in the same areas as the passage holes in the base body.

7. The installation body assembly as defined in claim 1, wherein the covering element and the lower covering part are arranged and configured such that they are connected with each other in the first rotary position of the covering part in a force-locking, friction-locking, and positive-locking manner.

8. The installation body assembly as defined in claim 1, wherein the base body and the lower covering part are respectively arranged and configured to be interlocked with each another.

9. The installation body assembly as defined in claim 1, wherein the base body comprises a substantially flat plate.

10. The installation body assembly as defined in claim 1, wherein each passage hole of the base body has a countersunk recess for receiving a screw head.

11. The installation body assembly as defined in claim 1, additionally comprising protrusions on a rear side of the lower covering part that faces away from the base body.

12. The installation body assembly as defined in claim 1, wherein the covering element and the lower covering part are symmetrically aligned with a center point (M) of the recess of the base body.

13. The installation body assembly as defined in claim 1, wherein the installation body is arranged and configured to facilitate a handle to be mounted on the installation body in an axially fixed and rotatable manner.

* * * * *